United States Patent
Chen et al.

(10) Patent No.: US 6,964,991 B2
(45) Date of Patent: Nov. 15, 2005

(54) PROCESS FOR IMPROVING WATER-WHITENING RESISTANCE OF PRESSURE SENSITIVE ADHESIVES

(75) Inventors: Augustin T. Chen, Cheshire, CT (US); Jong-Shing Guo, Longmeadow, MA (US); Tibor Pernecker, Wilbraham, MA (US)

(73) Assignee: Surf Chip, Inc., Wilmington, DE (US)

( * ) Notice: Subject to any disclaimer, the term of this patent is extended or adjusted under 35 U.S.C. 154(b) by 520 days.

(21) Appl. No.: 10/154,081

(22) Filed: May 23, 2002

(65) Prior Publication Data

US 2003/0055161 A1 Mar. 20, 2003

Related U.S. Application Data

(63) Continuation-in-part of application No. 10/142,455, filed on May 10, 2002.
(60) Provisional application No. 60/305,174, filed on Jul. 13, 2001.

(51) Int. Cl.$^7$ ............................... C08F 2/26; C08J 3/03
(52) U.S. Cl. ...................... 524/457; 524/368; 524/800; 524/801; 524/831; 524/833
(58) Field of Search ................................. 524/457, 800, 524/801, 831, 833, 368

(56) References Cited

U.S. PATENT DOCUMENTS

| | | |
|---|---|---|
| 4,814,514 A | 3/1989 | Yokota et al. |
| 5,286,843 A | 2/1994 | Wood |
| 5,332,854 A | 7/1994 | Yokota et al. |
| 5,496,603 A | 3/1996 | Riedel et al. |
| 5,620,796 A | 4/1997 | Kawabata et al. |
| 5,928,783 A * | 7/1999 | Phan et al. ............ 428/355 EN |
| 6,013,722 A | 1/2000 | Yang et al. |
| 6,190,767 B1 | 2/2001 | Ishikawa et al. |
| 6,239,240 B1 | 5/2001 | Schultz et al. |

FOREIGN PATENT DOCUMENTS

| | | |
|---|---|---|
| EP | 0554832 A | 8/1993 |
| EP | 0971010 A1 | 1/2000 |
| JP | 2596441 B2 | 4/1989 |
| JP | 06-65551 A2 | 3/1994 |
| JP | 09-278837 A2 | 10/1997 |
| WO | WO 97/11996 A1 | 4/1997 |
| WO | WO 9802497 A | 1/1998 |
| WO | WO 00/61670 A1 | 10/2000 |
| WO | WO 01/85867 A1 | 11/2001 |

* cited by examiner

Primary Examiner—Tae H. Yoon
(74) Attorney, Agent, or Firm—Lathrop & Gage, L.C.

(57) ABSTRACT

Pressure sensitive adhesive compositions having enhanced resistance to water-whitening comprising an aqueous emulsion polymer are disclosed. The polymer comprises the polymerization reaction product of a polymerizable aqueous emulsion comprising: (i) a hydrophobic monomer mixture of at least one alkyl acrylate or alkyl methacrylate ester of an alcohol wherein the alkyl portion of the alcohol is linear or branched and contains at least 4 carbon atoms, and at least one styrenic monomer, wherein the styrenic monomer is up to about 30 wt. % of the total hydrophobic monomer mixture, (ii) at least about 1 wt. % of at least one hydrophilic monomer, (iii) at least about 5 wt. % of at least one partially hydrophilic monomer selected from alkyl acrylate or alkyl methacrylate esters of an alcohol wherein the alkyl portion of the alcohol has 1 to 2 carbon atoms, N-vinyl-2-pyrrolidone, or mixtures thererof, and (iv) a water-soluble or water-dispersible polymerizable surfactant selected from compounds having a terminal allyl amine moiety, polyoxyalkylene-1-(allyloxymethyl) alkyl ether sulfate salts, or mixtures thereof, and the average particle size of the polymer is less than or equal to 200 nm. Also disclosed are processes for preparing same.

6 Claims, No Drawings

PROCESS FOR IMPROVING WATER-WHITENING RESISTANCE OF PRESSURE SENSITIVE ADHESIVES

CROSS REFERENCE TO RELATED APPLICATION

This application is a nonprovisional application which claims the priority of prior provisional application Ser. No. 60/305,174, filed Jul. 13, 2001 and is a continuation-in-part of application Ser. No. 10/142,455, filed May 10, 2002, the disclosures of which are incorporated herein by reference in their entirety.

BACKGROUND OF THE INVENTION

This invention relates to pressure sensitive adhesives based on aqueous emulsions and processes for preparation of the adhesives. The pressure sensitive adhesives of the invention have enhanced resistance to water-whitening.

These pressure sensitive adhesives are particularly suitable for applications that require that the pressure sensitive adhesive maintain adhesion between the substrate and facestock when subjected to hot water spraying or immersion. Hot water adhesion is required in applications such as bottle labels where the bottles are subjected to hot water spraying in washing operations. In general, resistance to water-whitening is desirable anywhere a pressure sensitive adhesive with transparent facestock or substrate is subjected to water or high humidity. Examples include labels on the sides of trucks, signs and bottles.

Methods of providing water-whitening resistant latex emulsions for use in pressure sensitive adhesives are disclosed in the art. U.S. Pat. No. 5,286,843 discloses a process for improving the water-whitening resistance of pressure sensitive adhesives containing an aqueous latex emulsion and water soluble ions by removing the water soluble ions and adjusting the pH to at least about 6. The patent discloses that water soluble ions may be removed by a number of techniques including centrifugation, dialysis, precipitation and deionization with ion exchange resins. The preferred method of removing the water soluble ions is to contact the aqueous latex emulsion, the formulated pressure sensitive adhesive containing the aqueous emulsion or both with an ion exchange resin. International Publication No. WO 97/11996 A1 discloses a process for preparing hot water-whitening resistant latex emulsions useful in pressure sensitive adhesive compositions. The process involves copolymerizing a monomer mixture containing at least one alkyl acrylate ester of an alcohol containing at least 4 carbon atoms, at least one polar co-monomer, and at least one partially water-soluble co-monomer present in an amount of at least about 7 wt. %. Polymerization is carried out in the presence of at least one nonionic surfactant containing at least 8 moles of ethylene oxide and at least one anionic surfactant containing up to about 10 moles of ethylene oxide. The polymerization product is neutralized to produce an emulsion having a pH greater than 7 and containing particles having a volume average particle size diameter up to about 165 nm. An electrolyte may be added subsequent to polymerization to stabilize opacity of a film cast from the emulsion. International Publication No. WO 00/61670 A1 discloses a process for preparing an aqueous latex emulsion for use in pressure sensitive adhesives that maintain adhesion in hot water environments in addition to exhibiting enhanced resistance to water-whitening. The process involves preparing an aqueous latex emulsion from a monomer mixture consisting essentially of at least one alkyl acrylate having at least 4 carbon atoms in the alkyl chain, at least one ethylenically unsaturated carboxylic acid, and at least one styrenic monomer, the polymerization being carried out in the presence of at least one anionic surfactant and a redox type free radical initiator system. The aqueous latex emulsion prepared according to the process of WO 00/61670 is disclosed to have polymer particles with a mean particle size diameter of less than or equal to about 100 nm. None of the above patents/publications disclose preparing pressure sensitive adhesives wherein a polymerizable surfactant is used.

U.S. Pat. Nos. 5,928,783 and 6,239,240 disclose processes for preparing aqueous emulsion polymers that have application as pressure sensitive adhesives. The polymers are prepared by reacting at least one ethylenically unsaturated monomer and a polymerizable surfactant having a terminal allyl amine moiety. Neither patent discloses preparation of pressure sensitive adhesives having enhanced resistance to water-whitening.

International Publication No. WO 01/85867 A1 discloses aqueous blush-retardant pressure sensitive adhesives made from an aqueous latex emulsion having an average particle size of not substantially above about 100 nm and emulsified in the presence of a reactive emulsifier consisting essentially of alkyl, alkenyl or aralkyl substituted phenyl compounds having at least one propenyl substituent, and a polyoxyalkylenesulfonate salt substituent as taught in U.S. Pat. No. 5,332,854. The aqueous latex emulsion is prepared from a monomer mixture consisting essentially of about 50 to about 90 wt. % of at least one acrylate having at least 4 carbon atoms in the alkyl chain, about 5 to about 10 wt. % of at least one ethylenically unsaturated carboxylic acid or its corresponding anhydride, and about 15 to about 40 wt. % of at least one styrenic monomer, wherein some or all of the styrenic monomer can be replaced with a hard monomer, i.e. a monomer having a $T_g$ greater than 30° C. such as methyl methacrylate, isobornyl acrylate, vinyl acetate, and the like.

SUMMARY OF THE INVENTION

It is an object of this invention to provide pressure sensitive adhesive ("PSA") compositions having resistance to water-whitening. It is another object of this invention to provide a process(es) for preparing pressure sensitive adhesives having enhanced resistance to water-whitening.

These and other objects are achieved in the invention which is described in more nonlimiting detail hereinafter.

According to the invention, a process for preparing a pressure sensitive adhesive having enhanced resistance to water-whitening is provided comprising: (a) forming a polymerizable aqueous pre-emulsion comprising: (i) a hydrophobic monomer mixture of at least one alkyl acrylate or alkyl methacrylate ester of an alcohol wherein the alkyl portion of the alcohol is linear or branched and contains at least 4 carbon atoms, and at least one styrenic monomer, wherein the styrenic monomer is up to about 30 wt. % of the total hydrophobic monomer mixture, (ii) at least about 1 wt. % of at least one hydrophilic monomer, (iii) at least about 5 wt. % of at least one partially hydrophilic monomer selected from alkyl acrylate or alkyl methacrylate esters of an alcohol wherein the alkyl portion of the alcohol has 1 to 2 carbon atoms, N-vinyl-2-pyrrolidone, or mixtures thereof, and (iv) a water-soluble or water-dispersible polymerizable surfactant selected from compounds having a terminal allyl amine moiety, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii) in the pre-emulsion; (b) contacting water, an effective amount of a water-soluble or water-dispersible polymerizable surfactant selected from compounds having a terminal allyl amine moiety, polyoxyalkylene-1-(allyloxymethyl) alkyl ether sulfate salts, or mixtures thereof, and an initial amount of polymerization initiator to form a mixture; (c) continuously adding the pre-emulsion to the mixture of (b) to polymerize the pre-emulsion to form a latex emulsion, wherein additional polymerization initiator is added during the polymerization of the pre-emulsion; and (d) adjusting the pH of the latex emulsion with a suitable base to a pH of about 6.5 to about 9; wherein the effective amount of water-soluble or water-dispersible polymerizable surfactant in the mixture of (b) is that amount necessary to produce pressure sensitive adhesive having an average particle size of less than or equal to 200 nm.

Further according to the invention, a process for preparing a pressure sensitive adhesive having enhanced resistance to water-whitening is provided comprising: (a) contacting water, an effective amount of a water-soluble or water-dispersible polymerizable surfactant selected from compounds having a terminal allyl amine moiety, polyoxyalkylene-1-(allyloxymethyl) alkyl ether sulfate salts, or mixtures thereof, and an initial amount of polymerization initiator to form a mixture; (b) continuously adding monomers and, optionally, additional water to the mixture and polymerizing the resultant emulsion to form a latex emulsion, wherein additional polymerization initiator is added during the polymerization of the emulsion, and wherein the monomers comprise: (i) a hydrophobic monomer mixture of at least one alkyl acrylate or alkyl methacrylate ester of an alcohol wherein the alkyl portion of the alcohol is linear or branched and contains at least 4 carbon atoms, and at least one styrenic monomer, wherein the styrenic monomer is up to about 30 wt. % of the total hydrophobic monomer mixture, (ii) at least about 1 wt. % of at least one hydrophilic monomer, (iii) at least about 5 wt. % of at least one partially hydrophilic monomer selected from alkyl acrylate or alkyl methacrylate esters of an alcohol wherein the alkyl portion of the alcohol has 1 to 2 carbon atoms, N-vinyl-2-pyrrolidone, or mixtures thereof, and (iv) a water-soluble or water-dispersible polymerizable surfactant selected from compounds having a terminal allyl amine moiety, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii); and (c) adjusting the pH of the latex emulsion with a suitable base to a pH of about 6.5 to about 9; wherein the effective amount of water-soluble or water-dispersible polymerizable surfactant in the mixture is that amount necessary to produce the pressure sensitive adhesive having an average particle size of less than or equal to 200 nm.

Further according to the invention, pressure sensitive adhesive compositions having enhanced resistance to water-whitening comprising an aqueous emulsion polymer are provided, the polymer comprising the polymerization reaction product of a polymerizable aqueous emulsion comprising: (i) a hydrophobic monomer mixture of at least one alkyl acrylate or alkyl methacrylate ester of an alcohol wherein the alkyl portion of the alcohol is linear or branched and contains at least 4 carbon atoms, and at least one styrenic monomer, wherein the styrenic monomer is up to about 30 wt. % of the total hydrophobic monomer mixture, (ii) at least about 1 wt. % of at least one hydrophilic monomer, (iii) at least about 5 wt. % of at least one partially hydrophilic monomer selected from alkyl acrylate or alkyl methacrylate esters of an alcohol wherein the alkyl portion of the alcohol has 1 to 2 carbon atoms, N-vinyl-pyrrolidone, or mixtures thererof, and (iv) a water-soluble or water-dispersible polymerizable surfactant selected from compounds having a terminal allyl amine moiety, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii); wherein after the polymerization the pH of the polymer is adjusted to a pH of about 6.5 to about 9, and the average particle size of the polymer is less than or equal to 200 nm.

Still further according to the invention, pressure sensitive adhesives having enhanced resistance to water-whitening produced by the process(es) described above are provided.

Optionally included in the process of the invention is the addition of a vinyl ester of a $C_2$ to $C_{10}$ carboxylic acid to the latex emulsion after the conversion of monomers (i), (ii) and (iii) is greater than 90%. The invention also optionally provides pressure sensitive adhesives wherein the polymerization reaction product further comprises a vinyl ester of a $C_2$ to $C_{12}$ carboxylic acid that is added to the polymerization reaction product after the conversion of monomers (i), (ii) and (iii) is greater than 90%.

BRIEF DESCRIPTION OF THE DRAWINGS

Not Applicable.

DETAILED DESCRIPTION OF THE INVENTION

This invention provides aqueous emulsion pressure sensitive adhesives useful in the production of products such as labels, decals and the like, particularly label and decal facestock that are at least partially transparent, and are subject to water or high humidity during use. The pressure sensitive adhesives of the invention are particularly useful in bottle label applications where the labeled bottles are subject to hot water environments.

The pressure sensitive adhesives of the invention exhibit enhanced resistance to water-whitening. The extent of water-whitening can be determined visually or by using UV/Visible spectroscopy measuring absorbance as a function of time. As used herein, the PSA's of the invention were determined to have an acceptable level of water whitening of the PSA film when (a) the increase of absorbance was less than 0.2, preferably less than 0.05, after 24 hour room temperature water immersion (as determined by UV/Visible spectroscopy), and/or (b) there was no visible change after 30 min. immersion in 190° F. (87.8° C.) water.

A first embodiment of the invention relates to a process for preparing a pressure sensitive adhesive having enhanced resistance to water-whitening comprising:
(i) a hydrophobic monomer mixture of at least one alkyl acrylate or alkyl methacrylate ester of an alcohol wherein the alkyl portion of the alcohol is linear or branched and contains at least 4 carbon atoms, and at least one styrenic monomer, wherein the styrenic monomer is up to about 30 wt. % of the total hydrophobic monomer mixture, (ii) at least about 1 wt. % of at least one hydrophilic monomer, (iii) at least about 5 wt. % of at least one partially hydrophilic monomer selected from alkyl acrylate or alkyl methacrylate esters of an alcohol wherein the alkyl portion of the alcohol has 1 to 2 carbon atoms, N-vinyl-2-pyrrolidone, or mixtures thereof, and (iv) a water-soluble or water-dispersible polymerizable surfactant selected from compounds having a terminal allyl amine moiety, polyoxyalkylene-1-

(allyloxymethyl) alkyl ether sulfate salts, or mixtures thereof, wherein the wt. % of monomers (i), (ii) and (iii) are based on the total weight of monomers (i), (ii) and (iii) in the pre-emulsion; (b) contacting water, an effective amount of a water-soluble or water-dispersible polymerizable surfactant selected from compounds having a terminal allyl amine moiety, polyoxyalkylene-1-(allyloxymethyl) alkyl ether sulfate salts, or mixtures thereof, and an initial amount of polymerization initiator to form a mixture; (c) continuously adding the pre-emulsion to the mixture of (b) to polymerize the pre-emulsion to form a latex emulsion, wherein additional polymerization initiator is added during the polymerization of the pre-emulsion; and (d) adjusting the pH of the latex emulsion with a suitable base to a pH of about 6.5 to about 9; wherein the effective amount of water-soluble or water-dispersible polymerizable surfactant in the mixture of (b) is that amount necessary to produce pressure sensitive adhesive having an average particle size of less than or equal to 200 nm, preferably less than or equal to 100 nm.

A second embodiment of the invention relates to a process for preparing a pressure sensitive adhesive having enhanced resistance to water-whitening comprising:
(a) contacting water, an effective amount of a water-soluble or water-dispersible polymerizable surfactant selected from compounds having a terminal allyl amine moiety, polyoxyalkylene-1-(allyloxymethyl) alkyl ether sulfate salts, or mixtures thereof, and an initial amount of polymerization initiator to form a mixture; (b) continuously adding monomers and, optionally, additional water to the mixture and polymerizing the resultant emulsion to form a latex emulsion, wherein additional polymerization initiator is added during the polymerization of the emulsion, and wherein said monomers comprise: (i) a hydrophobic monomer mixture of at least one alkyl acrylate or alkyl methacrylate ester of an alcohol wherein the alkyl portion of the alcohol is linear or branched and contains at least 4 carbon atoms, and at least one styrenic monomer, wherein the styrenic monomer is up to about 30 wt. % of the total hydrophobic monomer mixture, (ii) at least about 1 wt. % of at least one hydrophilic monomer, (iii) at least about 5 wt. % of at least one partially hydrophilic monomer selected from alkyl acrylate or alkyl methacrylate esters of an alcohol wherein the alkyl portion of the alcohol has 1 to 2 carbon atoms, N-vinyl-2-pyrrolidone, or mixtures thereorof, and (iv) a water-soluble or water-dispersible polymerizable surfactant selected from compounds having a terminal allyl amine moiety, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii) added to the mixture; and (c) adjusting the pH of the latex emulsion with a suitable base to a pH of about 6.5 to about 9; wherein the effective amount of water-soluble or water-dispersible polymerizable surfactant in the mixture is that amount necessary to produce the pressure sensitive adhesive having an average particle size of less than or equal to 200 nm, preferably less than or equal to 100 nm.

Hydrophobic monomers that can be employed according to the invention include mixtures of at least one alkyl acrylate or alkyl methacrylate ester of an alcohol wherein the alkyl portion of the alcohol is linear or branched and contains at least 4 carbon atoms, and at least one styrenic monomer. The alkyl groups of the alkyl acrylate or alkyl methacrylate monomers are preferably linear or branched alkyl radicals having from 4 to about 14 carbon atoms, more preferably from 4 to about 10 carbon atoms, and most preferably from 4 to about 8 carbon atoms. Examples of suitable alkyl acrylates and alkyl methacrylates include, but are not limited to, isooctyl acrylate, 4-methyl-2-pentyl acrylate, 2-methyl-butyl acrylate, isoamyl acrylate, sec-butyl acrylate, n-butyl acrylate, 2-ethylhexyl acrylate, isodecyl methacrylate, isononyl acrylate, isodecyl acrylate, and the like, singly or in mixtures of two or more. Examples of suitable styrenic monomers include, but are not limited to, styrene, α-methyl styrene, vinyl toluene, t-butyl styrene, dimethyl styrene, and the like, singly or in mixtures of two or more.

The currently preferred alkyl acrylate or alkyl methacrylate ester monomers are 2-ethylhexyl acrylate, n-butyl acrylate, and mixtures thereof. The currently preferred styrenic monomer is styrene.

The amount of hydrophobic monomers based on the total weight of monomers (i), (ii) and (iii) is preferably about 70 to about 90 wt. %, and more preferably about 75 to about 85 wt. %.

The amount of styrenic monomer employed in the invention can conveniently be expressed as a wt. % of the total hydrophobic monomer mixture. The amount of styrenic monomer is up to about 30 wt. %, preferably about 5 to about 30 wt. %, and more preferably about 10 to about 20 wt. %, of the total hydrophobic monomer mixture.

Hydrophilic monomers that can be employed according to the invention are monomers that are copolymerizable with the hydrophobic monomer and that are water soluble. The hydrophilic monomers are selected from monoolefinic monocarboxylic acids, monoolefinic dicarboxylic acids, or mixtures thereof.

Examples of suitable hydrophilic monomers include, but are not limited to, acrylic acid, methacrylic acid, fumaric acid, maleic acid, itaconic acid, crotonic acid, oligomeric acrylic acid, and mixtures thereof. The currently preferred acids are acrylic acid, methacrylic acid, and mixtures thereof.

The amount of hydrophilic monomers based on the total weight of monomers (i), (ii) and (iii) is at least about 1 wt. %, preferably about 2 to about 10 wt. %, more preferably about 3 to about 10 wt. %, and most preferably about 4 to about 8 wt. %.

Partially hydrophilic monomers that can be employed according to the invention include alkyl acrylate or alkyl methacrylate esters of an alcohol wherein the alkyl portion of the alcohol has 1 to 2 carbon atoms, N-vinyl-2-pyrrolidone, or mixtures thereof. The partially hydrophilic monomers can also be referred to as partially water soluble monomers.

Examples of suitable partially hydrophilic monomers include methyl acrylate, methyl methacrylate, ethyl acrylate, N-vinyl-2-pyrrolidone, and mixtures thereof. The currently preferred partially hydrophilic monomers are methyl acrylate, methyl methacrylate, and mixtures thereof, with methyl acrylate being currently most preferred.

The amount of partially hydrophilic monomers based on the total weight of monomers (i), (ii) and (iii) is at least about 5 wt. %, preferably about 5 to about 20 wt. %, more preferably about 5 to about 18 wt. %, and most preferably about 10 to about 16 wt. %.

Water-soluble or water-dispersible polymerizable surfactants having a terminal allyl amine moiety that can be employed according to the invention include those polymerizable surfactants disclosed in U.S. Pat. No. 5,928,783 and U.S. Pat. No. 6,239,240, which are incorporated herein by reference in their entirety. Preferably, the polymerizable surfactants of the invention contain a hydrophilic portion selected from a sulfonate allyl amine moiety, a sulfate allyl amine moiety, or a phosphate allyl amine moiety, and a hydrophobic portion selected from —R, or a group having the formula RO—$(CH_2CH_2O)_n$—; wherein R is an alkyl group or an alkyl-substituted phenyl group wherein the alkyl group has 1 to 20 carbon atoms, preferably 10 to 18 carbon atoms, and n is an integer from 2 to 100, preferably 2 to 15. The hydrophilic portion and the hydrophobic portion are connected by means of a covalent bond. Combinations of such polymerizable surfactants can be used in preparing the polymers of the invention. The water-soluble or water-dispersible polymerizable surfactants having a terminal allyl amine moiety useful in the invention are available from Stepan Company under the Polystep® NMS trademark.

Suitable water-soluble or water-dispersible polymerizable surfactants having a terminal allyl amine moiety include, but are not limited to, the following examples.

A preferred polymerizable surfactant is an allyl amine salt of an alkyl benzene sulfonate having the formula

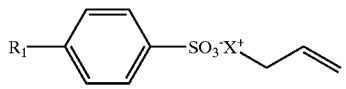

wherein $R_1$ is an alkyl group having 1 to 20 carbon atoms, preferably 10 to 18 carbon atoms, and $X^+$ is selected from $^+NH_3$, $^+NH_2R_4$, or $^+NHR_4R_5$, wherein $R_4$ and $R_5$ are independently selected from $C_1$–$C_4$ alkyl or hydroxyalkyl groups. $X^+$ is preferably $^+NH_3$. An example of a polymerizable surfactant of this type is an allyl amine salt of dodecylbenzene sulfonate.

Another preferred polymerizable surfactant is an allyl amine salt of an alkyl ether sulfate having the formula

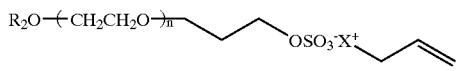

wherein $R_2$ is an alkyl group having 1 to 20 carbon atoms, preferably 10 to 18 carbon atoms, n is an integer from 2 to 100, preferably 2 to 15, and $X^+$ is selected from $NH_3^+$, $^+NH_2R_4$, or $^+NHR_4R_5$, wherein $R_4$ and $R_5$ are independently selected from $C_1$–$C_4$ alkyl or hydroxyalkyl groups. $X^+$ is preferably $^+NH_3$. An example of a polymerizable surfactant of this type is an allyl amine salt of laureth sulfate.

Another preferred polymerizable surfactant is an allyl amine salt of a phosphate ester having the formula

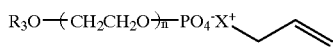

wherein $R_3$ is an alkyl or alkyl-substituted phenyl group wherein the alkyl group has 1 to 20 carbon atoms, n is an integer from 2 to 100, preferably 2 to 15, and $X^+$ is selected from $^+NH_3$, $^+NH_2R_4$, or $^+NHR_4R_5$, wherein $R_4$ and $R_5$ are independently selected from $C_1$–$C_4$ alkyl or hydroxyalkyl groups. $X^+$ is preferably $^+NH_3$. An example of a polymerizable surfactant of this type is an allyl amine salt of nonylphenol ethoxylate (9 moles EO) phosphate ester.

Yet another preferred polymerizable surfactant is an allyl amine salt of a sulfate having the formula

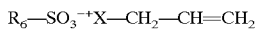

wherein $R_3$ is an alkyl group having 6 to 20 carbon atoms, preferably 10 to 18 carbon atoms, and $X^+$ is selected from $^+NH_3$, $^+NH_2R_4$, or $^+NHR_4R_5$, wherein $R_4$ and $R_5$ are independently selected from $C_1$–$C_4$ alkyl or hydroxyalkyl groups. $X^+$ is preferably $^+NH_3$.

The polyoxyalkylene-1-(allyloxymethyl) alkyl ether sulfate salt compounds that can be employed as water-soluble or water-dispersible polymerizable surfactants according to the invention include those disclosed in Japanese Patent No. JP 2596441 B2 (Dai-Ichi Kogyo Seiyaku Co., Ltd.).

Suitable polyoxyalkylene-1-(allyloxymethyl) alkyl ether sulfate salt compounds include compounds having the formula:

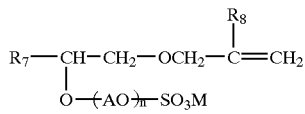

wherein $R_7$ is an alkyl group containing 8 to 30 carbon atoms, preferably 8 to 14 carbon atoms, and more preferably 10 to 12 carbon atoms, wherein $R_7$ can be linear or branched; $R_8$ is hydrogen or methyl, preferably hydrogen; A is an unsubstituted or substituted alkylene group having 2 to 4 carbon atoms; n is 0 or an integer of 1 to about 200, preferably 2 to about 100, more preferably 2 to about 30; and M is an alkali metal, an ammonium ion, or an alkanolamine residue. Examples of alkanolamine residues include monoethanolamine, triethanolamine, and the like.

For A, suitable unsubstituted or substituted alkylene groups include, for example, ethylene, propylene, butylene, and isobutylene. The polyoxyalkylene group —$(AO)_n$— can be a homo-, block or random polymer, or a mixture thereof.

The polyoxyalkylene-1-(allyloxymethyl) alkyl ether sulfate salt compounds of the invention can be prepared according to the methods described in Japanese Patent No. JP 2596441 B2.

A currently preferred group of polyoxyalkylene-1-(allyloxymethyl) alkyl ether sulfate salt compounds are those compounds having the formula:

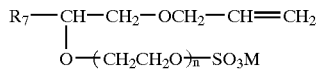

wherein $R_7$ is an alkyl group containing 8 to 14 carbon atoms, and preferably 10 to 12 carbon atoms; n is an integer of 1 to about 200, preferably 2 to about 100, more preferably 2 to about 30; and M is an alkali metal, an ammonium ion, or an alkanolamine residue. More preferred compounds are those wherein $R_7$ is a decyl or dodecyl group, n is 5 to 10, and M is $NH_4$, such as the compounds available from Dai-Ichi Kogyo Seiyaku Co., Ltd. (Tokyo, Japan) under the trademark Hitenol® KH.

The total amount of water-soluble or water-dispersible polymerizable surfactant utilized in the process, e.g. added in steps (a) and (b) of the process, based on the total weight of monomers (i), (ii) and (iii) is about 0.1 to about 5 wt. %, preferably about 0.5 to about 2 wt. %.

The amount of water-soluble or water-dispersible polymerizable surfactant added to the mixture of water, polymerizable surfactant, and polymerization initiator is that amount effective to produce a latex emulsion having particles having an average particle size of less than or equal to 200 nm, preferably less than or equal to 100 nm. The effective amount needed to obtain the required particle size will be dependent on operating conditions known in the art to have an affect on particle size, including agitation (shear), viscosity, and the like. The remainder of the polymerizable surfactant is added with monomers (i), (ii) and (iii). In a preferred embodiment of the invention, the amount of polymerizable surfactant added to the mixture of water, polymerizable surfactant, and polymerization initiator is at least about 20 wt. % of the total amount of polymerizable surfactant added in steps (a) and (b). In the preferred embodiment of the invention, the amount of polymerizable surfactant added with monomers (i), (ii) and (iii) is less than about 80 wt. % of the total amount of polymerizable surfactant added in steps (a) and (b).

The process(es) of the invention also utilizes at least one water-soluble polymerization initiator. Any conventional water-soluble polymerization initiator that is normally acceptable for emulsion polymerization of acrylate monomers may be used and such polymerization initiators are well known in the art. The typical concentration of water-soluble polymerization initiators is about 0.01 wt. % to about 1 wt. %, preferably about 0.01 wt. % to about 0.5 wt. %, of the total weight of monomers (i), (ii) and (iii) charged in the pre-emulsion. The water soluble polymerization initiators can be used alone or used in combination with one or more conventional reducing agents, such as bisulfites, metabisulfites, ascorbic acid, sodium formaldehyde sulfoxylate, ferrous sulfate, ferrous ammonium sulfate, ferric ethylenediamine-tetraacetic acid, and the like. Water-soluble polymerization initiators that can be employed according to the invention include water soluble persulfates, peroxides, azo compounds and the like, and mixtures thereof. Examples of water soluble initiators include, but are not limited to, persulfates (e.g. potassium persulfate, and sodium persulfate), peroxides (e.g. hydrogen peroxide, and tert-butyl hydroperoxide), and azo compounds (e.g. 4,4'-azobis(4-cyano-pentanoic acid), V-501 from Wako Chemicals). Currently the preferred water soluble polymerization initiators are the persulfates, particularly potassium persulfate.

The polymerization can be initiated by any conventional method known to those skilled in the art, such as by application of heat or radiation. The method of initiation will be dependent on the water-soluble polymerization initiator used and will be readily apparent to those skilled in the art.

The water soluble polymerization initiator can be added to the polymerization reaction in any conventional manner known in the art. It is currently preferred to add a portion of the initiator to the initial reactor charge which comprises water, an effective amount of the water-soluble or water-dispersible polymerizable surfactant, and an initial amount of the polymerization initiator. The remainder of the initiator can be added continuously or incrementally during the emulsion polymerization. It is currently preferred to incrementally add the remaining initiator.

Following polymerization, the pH of the latex emulsion is adjusted by contacting the latex emulsion with a suitable base in an amount necessary to raise the pH to about 6.5 to about 9, preferably about 7 to about 8. Examples of suitable bases for adjusting the pH of the latex emulsion include alkali metal hydroxides, alkaline earth metal hydroxides, ammonium hydroxide, amines, and the like, and mixtures thereof. The currently preferred base for use in the invention is ammonium hydroxide.

The latex emulsion typically has a solids content of from about 40 to about 70 wt. %, preferably about 45 to about 55 wt. %, and more preferably about 46 to about 48 wt. %.

In an optional, but currently preferred, embodiment of the invention, the processes of the invention further comprise the addition of a vinyl ester of a $C_2$ to $C_{12}$ aliphatic carboxylic acid to the latex emulsion after the conversion of monomers (i), (ii) and (iii) is greater than 90%, preferably greater than 95%, and more preferably greater than 97%. Typically, this can be accomplished in the processes of the invention by adding the vinyl ester to the latex emulsion after the addition of monomers (i), (ii) and (iii) is completed.

Examples of suitable vinyl esters for use in the processes of the invention include, but are not limited to, vinyl acetate, vinyl propionate, vinyl butyrate, vinyl isobutyrate, vinyl 2-ethylhexanoate, vinyl laurate, the vinyl esters of neo-acids (available from Resolution Performance Products under the trademark VeoVa™), and the like, and mixtures thereof. The preferred vinyl esters are those that have a reactivity similar to the reactivity of the water-soluble or water-dispersible polymerizable surfactant.

The amount of vinyl ester added to the latex emulsion is about 0.1 to about 1 wt. %, preferably about 0.2 to about 0.8 wt. %, of the total weight of monomers (i), (ii) and (iii) charged to the polymerization.

If a vinyl ester is used in the processes of the invention, it is currently preferred that additional polymerization initiator be added at the time of addition of the vinyl ester.

The polymerization reaction can be conducted in any conventional reaction vessel capable of an emulsion polymerization.

The polymerization can be conducted at a temperature typical for emulsion polymerizations. The polymerization is preferably conducted at a temperature in the range of about 50° C. to about 95° C., preferably in the range of about 60° C. to about 85° C.

The polymerization time is that time needed to achieve the desired conversion based on the other reaction conditions, e.g. temperature profile, and reaction components, e.g. monomers, initiator, etc. The polymerization time will be readily apparent to those skilled in the art.

A third embodiment of the invention relates to pressure sensitive adhesive compositions having enhanced resistance to water-whitening comprising an aqueous emulsion polymer are provided, the polymer comprising the polymerization reaction product of a polymerizable aqueous emulsion comprising: (i) a hydrophobic monomer mixture of at least one alkyl acrylate or alkyl methacrylate ester of an alcohol wherein the alkyl portion of the alcohol is linear or branched and contains at least 4 carbon atoms, and at least one styrenic monomer, wherein the styrenic monomer is up to about 30 wt. % of the total hydrophobic monomer mixture, (ii) at least about 1 wt. % of at least one hydrophilic monomer, (iii) at least about 5 wt. % of at least one partially hydrophilic monomer selected from alkyl acrylate or alkyl methacrylate esters of an alcohol wherein the alkyl portion of the alcohol has 1 to 2 carbon atoms, N-vinyl-2-pyrrolidone, or mixtures thererof, and (iv) a water-soluble or water-dispersible polymerizable surfactant selected from compounds having a terminal allyl amine moiety, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii); wherein after the polymerization the pH of the polymer is adjusted to a pH of about 6.5 to about 9, and the average particle size of the polymer is less than or equal to 200 nm, preferably less than or equal to 100 nm.

In an optional, but currently preferred, embodiment of the invention, the PSA compositions of the invention further comprise a vinyl ester of a $C_2$ to $C_{12}$ aliphatic carboxylic acid, the vinyl ester having been added to the latex emulsion after the conversion of monomers (i), (ii) and (iii) is greater than 90%, preferably greater than 95%, and more preferably greater than 97%.

EXAMPLES

Abbreviations and Source of Materials

| | |
|---|---|
| 2-EHA: | 2-ethylhexyl acrylate; Ashland Inc. |
| S: | styrene; Shell Chemicals LP |
| MA: | methyl acrylate; Ashland Inc. |
| AA: | acrylic acid; Ashland Inc. |
| MAA: | methacrylic acid; Ashland Inc. |
| PPS: | potassium persulfate; Sigma-Aldrich Co. |
| $NH_4OH$: | Ammonium hydroxide (28%); Sigma-Aldrich Co. |
| Mylar: | polyester film; DuPont |
| Hitenol KH-05: | Polyoxyethylene-1-(allyloxymethyl) alkyl ether sulfate, ammonium salt; Dai-Ichi Kogyo Seiyaku Co., Ltd. |
| Polystep NMS-7 | allylammonium laureth-3-sulfate; Stepan Company |

Example 1

In a 2L jacketed glass reactor equipped with a reflux condenser, thermocouple and twin blade agitator, a poly(acrylate-co-styrene) latex was prepared. Monomer pre-emulsion was prepared by mixing 122.8 g water, 307.34 g 2-EHA, 70 g S, 65.68 g MA, 9.56 g MAA, and 13.4 g AA with 4.28 g Hitenol KH-05. The reactor was charged with 296.72 g of water, 1.8 g PPS, and 1.47 g of Hitenol KH-05. Separately, 72.12 g of PPS stock solution (2.86 wt. % concentration) was prepared in water. The reactor was heated with water. When the temperature reached 78° C., 6 g of the PPS stock solution was added and the monomer pre-emulsion delay was started at a 3.03 g/min rate and continued for 200 minutes. The temperature was maintained at 83° C. and the polymerization charge agitated continuously at 240 rpm. Every 20 min, 6 g of the PPS stock solution was added to the reactor over a period of 220 minutes. After the final charge of the PPS stock solution was completed, the reactor temperature was raised to 88° C. and agitated for an additional 60 minutes.

The latex has 48.63% solids. The wt. % solids was determined by placing a known amount of latex into a weighed aluminum weighing tin, drying at 150° C. for 60 min, weighing the tin again and calculating the solids content. The average particle size is 70 nm as measured using a Horiba laser scattering particle size distribution analyzer model LA-910. The pH was 2.24 as measured using an Orion model 250 pH meter. The latex was then neutralized with $NH_4OH$ to a pH of 7.02. The Brookfield viscosity is 3620 cp using a Brookfield viscometer LV II+ with spindle #3 at 30 rpm.

The neutralized latex was direct coated on a 1 mil Mylar film. The film was air dried for 10 min and heat dried at 90° C. for 5 min. The coated Mylar was laminated with release liner (direct coat). For water whitening/water immersion tests, the release liners were removed thus exposing the polymer surfaces to water. UV/Visible spectroscopy (UV/VIS) using a Cintra 40 UV-Visible spectrophotometer was used to determine absorbance. The coated Mylar film (facestock) was placed in a cuvette which was filled with water at time=0. The light absorbance was measured and recorded for 24 hr at 400 nm (room temperature). The final absorbance increase of the direct-coated film was 0.001.

Example 2

In a 2L jacketed glass reactor equipped with a reflux condenser, thermocouple and twin blade agitator, a poly(acrylate-co-styrene) latex was prepared. Monomer pre-emulsion was prepared by mixing 122.8 g water, 307.34 g 2-EHA, 70 g S, 65.68 g MA, 9.56 g MAA, and 13.4 g AA with 9.27 g Polystep NMS-7. The reactor was charged with 296.72 g of water, 1.8 g PPS, and 3 g of Polystep NMS-7. Separately, 72.12 g of PPS stock solution (2.86 wt. % concentration) was prepared in water. The reactor was heated with water. When the temperature reached 78° C., 6 g of the PPS stock solution was added and the monomer pre-emulsion delay was started at a 3.03 g/min rate and continued for 200 minutes. The temperature was maintained at 83° C. and the polymerization charge agitated continuously at 240 rpm. Every 20 min, 6 g of the PPS stock solution was added to the reactor over a period of 220 minutes. After the final charge of the PPS stock solution was completed, the reactor temperature was raised to 88° C. and agitated for an additional 60 minutes.

The latex has 47.78% solids. The wt. % solids was determined by placing a known amount of latex into a weighed aluminum weighing tin, drying at 150° C. for 60 min, weighing the tin again and calculating the solids content. The average particle size is 82 nm as measured using a Horiba laser scattering particle size distribution analyzer model LA-910. The pH was 2.24 as measured using an Orion model 250 pH meter. The latex was then neutralized with $NH_4OH$ to a pH of 6.91. The Brookfield viscosity is 3980 cp using a Brookfield viscometer LV II+ with spindle #3 at 30 rpm.

The neutralized latex was direct coated on a 1 mil Mylar film. The film was air dried for 10 min and heat dried at 90° C. for 5 min. The coated Mylar was laminated with release liner (direct coat). For water whitening/water immersion tests, the release liners were removed thus exposing the polymer surfaces to water. U/Visible spectroscopy (UV/VIS) using a Cintra 40 UV-Visible spectrophotometer was used to determine absorbance. The coated Mylar film (facestock) was placed in a cuvette which was filled with water at time=0. The light absorbance was measured and recorded for 24 hr at 400 nm (room temperature). The final absorbance increase of the direct-coated film was 0.001.

Example 3

In a 2L jacketed glass reactor equipped with a reflux condenser, thermocouple and twin blade agitator, a poly(acrylate-co-styrene) latex was prepared. Monomer pre-emulsion was prepared by mixing 122.8 g water, 271.4 g 2-EHA, 116.5 g S, 57.55 g MA, 8.2 g MAA, and 12.35 g AA with 4.28 g Hitenol KH-05. The reactor was charged with 296.72 g of water, 1.8 g PPS, and 1.47 g of Hitenol KH-05. Separately, 72.12 g of PPS stock solution (2.86 wt. % concentration) was prepared in water. The reactor was heated with water. When the temperature reached 78° C., 6 g of the PPS stock solution was added and the monomer pre-emulsion delay was started at a 3.03 g/min rate and continued for 200 minutes. The temperature was maintained at 83° C. and the polymerization charge agitated continuously at 240 rpm. Every 20 min, 6 g of the PPS stock solution was added to the reactor over a period of 220 minutes. After the final charge of the PPS stock solution was completed, the reactor temperature was raised to 88° C. and agitated for an additional 60 minutes.

The latex has 49.3% solids. The wt. % solids was determined by placing a known amount of latex into a weighed aluminum weighing tin, drying at 150° C. for 60 min, weighing the tin again and calculating the solids content. The average particle size is 80 nm as measured using a Horiba laser scattering particle size distribution analyzer model LA-910. The pH was 2.21 as measured using an Orion model 250 pH meter. The latex was then neutralized with NH$_4$OH to a pH of 6.98. The Brookfield viscosity is 8800 cp using a Brookfield viscometer LV II+ with spindle #4 at 30 rpm.

The neutralized latex was direct coated on a 1 mil Mylar film. The film was air dried for 10 min and heat dried at 90° C. for 5 min. The coated Mylar was laminated with release liner (direct coat). For water whitening/water immersion tests, the release liners were removed thus exposing the polymer surfaces to water. UV/Visible spectroscopy (U/VIS) using a Cintra 40 UV-Visible spectrophotometer was used to determine absorbance. The coated Mylar film (facestock) was placed in a cuvette which was filled with water at time=0. The light absorbance was measured and recorded for 24 hr at 400 nm (room temperature). The final absorbance increase of the direct-coated film was 0.001.

Example 4

In a 2L jacketed glass reactor equipped with a reflux condenser, thermocouple and twin blade agitator, a poly (acrylate-co-styrene) latex was prepared. Monomer pre-emulsion was prepared by mixing 122.8 g water, 343.75 g 2-EHA, 23.3 g S, 72.93 g MA, 10.39 g MAA, and 15.61 g AA with 4.28 g Hitenol KH-05. The reactor was charged with 296.72 g of water, 1.8 g PPS, and 1.47 g of Hitenol KH-05. Separately, 72.12 g of PPS stock solution (2.86 wt. % concentration) was prepared in water. The reactor was heated with water. When the temperature reached 78° C., 6 g of the PPS stock solution was added and the monomer pre-emulsion delay was started at a 3.03 g/min rate and continued for 200 minutes. The temperature was maintained at 83° C. and the polymerization charge agitated continuously at 240 rpm. Every 20 min, 6 g of the PPS stock solution was added to the reactor over a period of 220 minutes. After the final charge of the PPS stock solution was completed, the reactor temperature was raised to 88° C. and agitated for an additional 60 minutes.

The latex has 49. % solids. The wt. % solids was determined by placing a known amount of latex into a weighed aluminum weighing tin, drying at 150° C. for 60 min, weighing the tin again and calculating the solids content. The average particle size is 86 nm as measured using a Horiba laser scattering particle size distribution analyzer model LA-910. The pH was 2.24 as measured using an Orion model 250 pH meter. The latex was then neutralized with NH$_4$OH to a pH of 6.99. The Brookfield viscosity is 9950 cp using a Brookfield viscometer LV II+ with spindle #4 at 30 rpm.

The neutralized latex was direct coated on a 1 mil Mylar film. The film was air dried for 10 min and heat dried at 90° C. for 5 min. The coated Mylar was laminated with release liner (direct coat). For water whitening/water immersion tests, the release liners were removed thus exposing the polymer surfaces to water. UV/Visible spectroscopy (UV/VIS) using a Cintra 40 UV-Visible spectrophotometer was used to determine absorbance. The coated Mylar film (facestock) was placed in a cuvette which was filled with water at time=0. The light absorbance was measured and recorded for 24 hr at 400 nm (room temperature). The final absorbance increase of the direct-coated film was 0.

We claim:

1. A process for preparing a pressure sensitive adhesive having enhanced resistance to water-whitening comprising:
   (a) forming a polymerizable aqueous pre-emulsion comprising: (i) a hydrophobic monomer mixture of at least one alkyl acrylate or alkyl methacrylate ester of an alcohol wherein the alkyl portion of the alcohol is linear or branched and contains at least 4 carbon atoms, and at least one styrenic monomer, wherein the styrenic monomer is up to about 30 wt. % of the total hydrophobic monomer mixture, (ii) at least about 1 wt. % of at least one hydrophilic monomer, (iii) at least about 5 wt. % of at least one partially hydrophilic monomer selected from alkyl acrylate or alkyl methacrylate esters of an alcohol wherein the alkyl portion of the alcohol has 1 to 2 carbon atoms, N-vinyl-2-pyrrolidone, or mixtures thererof, and (iv) a water-soluble or water-dispersible polymerizable surfactant selected from compounds having a terminal allyl amine moiety, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii) in said pre-emulsion;
   (b) contacting water, an effective amount of a water-soluble or water-dispersible polymerizable surfactant selected from compounds having a terminal allyl amine moiety, polyoxyalkylene-1-(allyloxymethyl) alkyl ether sulfate salts, or mixtures thereof, and an initial amount of polymerization initiator to form a mixture;
   (c) continuously adding said pre-emulsion to said mixture to polymerize said pre-emulsion to form a latex emulsion, wherein additional polymerization initiator is added during the polymerization of said pre-emulsion; and
   (d) adjusting the pH of said latex emulsion with a suitable base to a pH of about 6.5 to about 9;
   wherein said effective amount of water-soluble or water-dispersible polymerizable surfactant in said mixture is that amount necessary to produce said pressure sensitive adhesive having an average particle size of less than or equal to 200 nm, and
   wherein said polymerizable surfactant has a hydrophilic portion selected from a sulfonate allyl amine moiety, a sulfate allyl amine moiety, or a phosphate allyl amine moiety, and a hydrophobic portion selected from —R, or a group having the formula RO—(CH$_2$CH$_2$O)$_n$—; wherein R is an alkyl group or an alkyl-substituted phenyl group wherein the alkyl group has 1 to 20 carbon atoms, and n is an integer from 2 to 100.

2. The process of claim 1 wherein n is an integer from 2 to 15.

3. A pressure sensitive adhesive composition having enhanced resistance to water-whitening comprising an aqueous emulsion polymer, said polymer comprising the polymerization reaction product of a polymerizable aqueous emulsion comprising: (i) a hydrophobic monomer mixture of at least one alkyl acrylate or alkyl methacrylate ester of an alcohol wherein the alkyl portion of the alcohol is linear or branched and contains at least 4 carbon atoms, and at least one styrenic monomer, wherein the styrenic monomer is up to about 30 wt. % of the total hydrophobic monomer mixture, (ii) at least about 1 wt. % of at least one hydrophilic monomer, (iii) at least about 5 wt. % of at least one partially hydrophilic monomer selected from alkyl acrylate or alkyl methacrylate esters of an alcohol wherein the alkyl portion of the alcohol has 1 to 2 carbon atoms, N-vinyl-2-pyrrolidone, or mixtures thererof, and (iv) a water-soluble or water-dispersible polymerizable surfactant selected from compounds having a terminal allyl amine moiety, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii) in said emulsion;

wherein after said polymerization the pH of said polymer is adjusted to a pH of about 6.5 to about 9, and the average particle size of said polymer is less than or equal to 200 nm, and wherein said polymerizable surfactant is a polyoxyalkylene-1-(allyloxymethyl) alkyl ether sulfate salt having the formula:

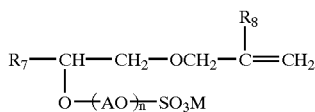

wherein $R_7$ is an alkyl group containing 8 to 30 carbon atoms; $R_8$ is hydrogen or methyl; A is an unsubstituted or substituted alkylene group having 2 to 4 carbon atoms; n is 0 or an integer of 1 to about 200; and M is an alkali metal, an ammonium ion, or an alkanolamine residue.

4. The composition of claim 3 wherein said polymerizable surfactant is a polyoxyalkylene-1-(allyloxymethyl) alkyl ether sulfate salt having the formula:

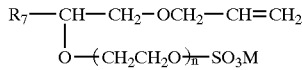

wherein $R_7$ is an alkyl group containing 8 to 14 carbon atoms; and n is an integer of 1 to about 200.

5. A process for preparing a pressure sensitive adhesive having enhanced resistance to water-whitening comprising:

(a) contacting water, an effective amount of a water-soluble or water-dispersible polymerizable surfactant selected from compounds having a terminal allyl amine moiety, polyoxyalkylene-1-(allyoxymethyl) alkyl ether sulfate salts, or mixtures thereof, and an initial amount of polymerization initiator to form a mixture;

(b) continuously adding monomers and, optionally, additional water to said mixture and polymerizing the resultant emulsion to form a latex emulsion, wherein additional polymerization initiator is added during the polymerization of said emulsion, and wherein said monomers comprise: (i) a hydrophobic monomer mixture of at least one alkyl acrylate or alkyl methacrylate ester of an alcohol wherein the alkyl portion of the alcohol is linear or branched and contains at least 4 carbon atoms, and at least one styrenic monomer, wherein the styrenic monomer is up to about 30 wt. % of the total hydrophobic monomer mixture, (ii) at least about 1 wt. % of at least one hydrophilic monomer, (iii) at least about 5 wt. % of at least one partially hydrophilic monomer selected from alkyl acrylate or alkyl methacrylate esters of an alcohol wherein the alkyl portion of the alcohol has 1 to 2 carbon atoms, N-vinyl-2-pyrrolidone, or mixtures thererof, and (iv) a water-soluble or water-dispersible polymerizable surfactant selected from compounds having a terminal allyl amine moiety, polyoxyalkylene-1-(allyloxymethyl) alkyl ether sulfate salts, or mixtures thereof, wherein the wt. % of monomers (i), (ii) and (iii) are based on the total weight of monomers (i), (ii) and (iii); and (c) adjusting the pH of said latex emulsion with a suitable base to a pH of about 6.5 to about 9;

wherein said effective amount of water-soluble or water-dispersible polymerizable surfactant in said mixture is that amount necessary to produce said pressure sensitive adhesive having an average particle size of less than or equal to 200 nm; and wherein said polymerizable surfactant is a polyoxyalkylene-1-(allyloxymethyl) alkyl ether sulfate salt having the formula:

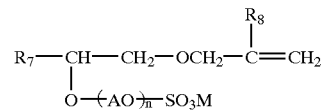

wherein $R_7$ is an alkyl group containing 8 to 30 carbon atoms; $R_8$ is hydrogen or methyl; A is an unsubstituted or substituted alkylene group having 2 to 4 carbon atoms; n is 0 or an integer of 1 to about 200; and M is an alkali metal, an ammonium ion, or an alkanolamine residue.

6. The process of claim 5 wherein said polymerizable surfactant is a polyoxyalkylene-1-(allyloxymethyl) alkyl ether sulfate salt having the formula:

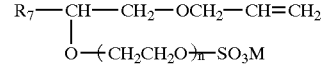

wherein $R_7$ is an alkyl group containing 8 to 14 carbon atoms; and n is an integer of 1 to about 200.

* * * * *